United States Patent [19]

Takeoka et al.

[11] Patent Number: 4,702,991
[45] Date of Patent: Oct. 27, 1987

[54] OPTICAL TYPE INFORMATION RECORDING MEDIUM AND MANUFACTURING METHOD THEREOF

[75] Inventors: Yoshikatsu Takeoka; Norio Ozawa, both of Kawasaki; Nobuaki Yasuda, Zushi, all of Japan

[73] Assignee: Kabushiki Kaisha Toshiba, Kawasaki, Japan

[21] Appl. No.: 875,527

[22] Filed: Jun. 20, 1986

Related U.S. Application Data

[63] Continuation of Ser. No. 778,245, Sep. 20, 1985, abandoned.

[30] Foreign Application Priority Data

| Oct. 30, 1984 | [JP] | Japan | 59-228506 |
| Feb. 4, 1985 | [JP] | Japan | 60-18689 |
| Feb. 4, 1985 | [JP] | Japan | 60-18690 |

[51] Int. Cl.$^4$ .............. G03C 1/72; G03C 1/74; G01D 9/00; B32B 7/00
[52] U.S. Cl. .................. 430/270; 430/290; 430/495; 430/935; 430/964; 427/255.2; 264/1.4; 346/135.1
[58] Field of Search .......... 430/270, 290, 495, 945, 430/964, 935; 346/135.1; 264/1.4; 427/455.2

[56] References Cited

U.S. PATENT DOCUMENTS

| 4,285,056 | 8/1981 | Bell | 430/964 |
| 4,300,227 | 11/1981 | Bell | 346/135.1 |
| 4,404,656 | 9/1983 | Cornet | 346/135.1 |
| 4,478,768 | 10/1984 | Takeoka et al. | 264/1.4 |
| 4,548,889 | 10/1985 | Nemeto et al. | 430/945 |
| 4,565,772 | 1/1986 | Takeoka et al. | 430/321 |
| 4,647,947 | 3/1987 | Takeoka et al. | 430/945 |

FOREIGN PATENT DOCUMENTS 0022313 1/1981 European Pat. Off. .

*Primary Examiner*—Richard L. Schilling
*Attorney, Agent, or Firm*—Oblon, Fisher, Spivak, McClelland, & Maier

[57] ABSTRACT

In an optical disk, a single recording layer is formed on a transparent substrate. The recording layer has an insulative base layer in which metal clusters and organic clusters are uniformly contained. When radiation is incident on the recording layer such that the intensity of the radiation is changed in accordance with the type of recording information, the metal clusters absorb radiation energy. The organic clusters produce a gas component in accordance with a level of the radiation energy absorbed by the metal clusters, thereby causing the base layer to incur a local projection by a pressure of the gas component such that a protuberance is formed on the base layer.

20 Claims, 22 Drawing Figures

OPTICAL TYPE INFORMATION RECORDING MEDIUM AND MANUFACTURING METHOD THEREOF

This application is a continuation, of application Ser. No. 778,245, filed Sept. 20, 1985, now abandoned.

BACKGROUND OF THE INVENTION

The present invention relates to an optical type information recording medium for optically recording information in response to radiation of a laser beam, and, more particularly, to an optical type information recording medium for recording information by forming local projections on a recording layer upon radiation of a write laser beam, and a manufacturing method therefor.

A conventional optical disk is known as an optical type recording medium having a recording layer which is locally projected in response to a laser beam. A typical recording layer of the optical disk of this type comprises a metal layer for absorbing laser beam energy, and an interlayer which is made of an organic material and which emits a gas component in response to beam energy. In general, the energy absorbing metal layer is locally heated to indirectly heat and decompose the organic interlayer which then generates a gas contained therein. A surface of the metal layer then acquires local projections as a result of the pressure of the gas produced from the organic interlayer. When a pulsated write laser beam, representing digital information, irradiates the optical disk, continuous concentric or spiral protuberances are formed on the surface of the metal layer in accordance with the mechanism described above, thereby storing the digital information.

According to the conventional optical disk of this type, the organic interlayer is indirectly heated and the utilization efficiency of the laser beam is greatly degraded. A high power laser beam must be used to form projectios, resulting in inconvenience. Since the recording layer comprises a multilayer structure, the manufacturing process is so complicated as to decrease the manufacturing yield.

In order to solve the above problem, another conventional optical disk has been developed wherein metallic clusters are dispersed in a hydrocarbon matrix in a recording layer. According to the optical disk of this type, the metallic clusters absorb beam energy upon radiation of a laser beam, and the hydrocarbon matrix emits a gas, thereby locally forming protuberances on the surface of the recording layer.

According to the optical disk described above, the structure of the recording layer is simplified to improve the utilization efficiency of the laser beam. However, it is difficult to properly control the relationship between the energy intensity of the laser beam and the amount of gas produced from the organic layer, thereby decreasing productivity of such optical disks. For example, when the energy intensity of the write beam is too high, the recording layer immediately bursts. Conversely, when the beam intensity is too low, the production of gas from the recording layer is insufficient to result in proper projection of the recording layer. An optimal (allowable) range of the beam intensity is thus narrowed, restricting the laser unit design. The amount of gas produced from the recording layer also depends on the ratio of the hydrocarbon matrix to the metallic clusters. Therefore, it is difficult to determine an optimal beam intensity. In order to perform proper information recording, a strict relationship between the ratio of the hydrocarbon matrix to the metallic cluster in the recording layer and the beam intensity must be established. When the manufacturing process control is restricted to obtain the necessary ratio, the yield of the disks may be limited, i.e., productivity may be lowered, resulting in high cost. The drawback of the conventional optical disk is due to insufficient thermal stability of the hydrocarbon matrix.

SUMMARY OF THE INVENTION

It is, therefore, an object of the present invention to provide a new and improved optical type information recording medium facilitating stable information recording even if incident radiation energy levels vary.

It is a further object of the present invention to provide a new and improved manufacturing method that will ensure stable information recording even if incident radiation energy levels vary.

According to the recording medium of the present invention, a single recording layer is formed on a substrate. When a radiation beam irradiates the recording layer such that the beam intensity varies in accordance with recording information, the recording layer absorbs the radiation energy and emits a gas component in accordance with the energy level. A partial projection is caued by the pressure of the gas emitted from the recording layer, thereby forming a protuberance corresponding to the input energy level. The recording layer is formed of a mixture of a heat-resistant insulative material, metallic clusters and organic clusters. The insulative material is nonvolatile and has a high vaporization point, and the metallic clusters absorb radiation energy. The organic clusters produce a gas component in accordance with the level of radiation energy absorbed by the metallic clusters, thereby causing formation of local projections of the insulative material, by the gas pressure, so as to form protuberances on the recording layer.

The recording layer, consisting of a mixture of a heat-resistant insulative material and metallic and organic clusters in the recording medium, can be formed, in a single step, by plasma sputtering. A target body is located essentially opposite to a substrate on which a recording layer is to be deposited in a proper gaseous atmosphere. A plasma is generated between the target body and the substrate to perform plasma sputtering. A plurality of types of clusters including the insulative material clusters constituting the matrix, the metallic clusters and the organic clusters are simultaneously deposited, as a mixture, on the substrate to form the recording layer. When a beam is incident on the recording layer and changed in intensity in accordance with recording information, the radiation energy is absorbed by the metallic clusters such that a gas component is emitted from the organic clusters in accordance with an input energy level. The base layer, consequently, incurs local projections by the pressure of the gas emitted from the recording layer, thereby forming protuberances in accordance with the input radiation energy level. The recording layer of the recording medium has a thermally stable matrix difficult to burst, thereby increasing the allowable range of intensity of an incident laser beam.

BRIEF DESCRIPTION OF THE DRAWINGS

The present invention is best understood by reference to the accompanying drawings, in which.

DETAILED DESCRIPTION OF THE PREFERRED EMBODIMENTS

Figure 1:
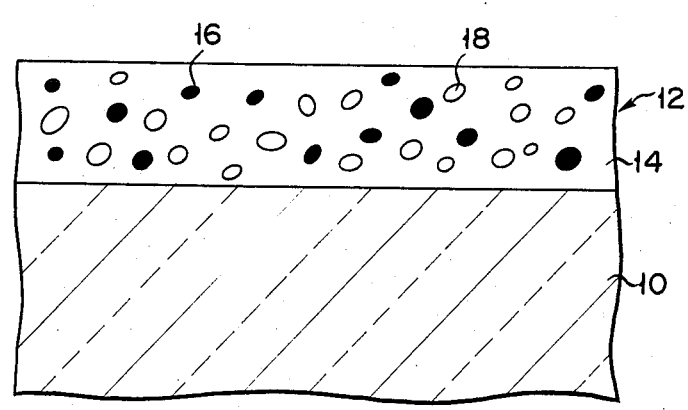
FIG. 1 is a sectional view showing the main part of an optical disk according to a first preferred embodiment of the present invention.

An optical disk according to a first embodiment of the present invention will be described with reference to FIG. 1. As shown in the enlarged view of FIG. 1, the optical disk has a transparent substrate 10 of glass or plastic on which a radiation sensitive recording layer 12 formed. It should be noted that only one layer 12 is formed on the substrate 10. The layer 12 has a function of absorbing energy of incident radiation such as a laser beam, a function of emitting a gas component in accordance with a level of absorbed beam energy and a function of forming local porjections in response to the pressure of the gas emitted therefrom.

The layer 12 is comprised of a thermally stabilized matrix 14 in a layered form, with both metal clusters 16 and organic clusters 18 dispersed in the matrix 14. For illustrative convenience, the organic clusters 18 are represented, in FIG. 1, by white dots, and the metal clusters 16 are represented by black dots so as to visually distinguish the organic clusters 18 from the metal clusters 16. The matrix 14 is made of a metal oxide which is nonvolatile and has a high vaporization point.

Figure 2:
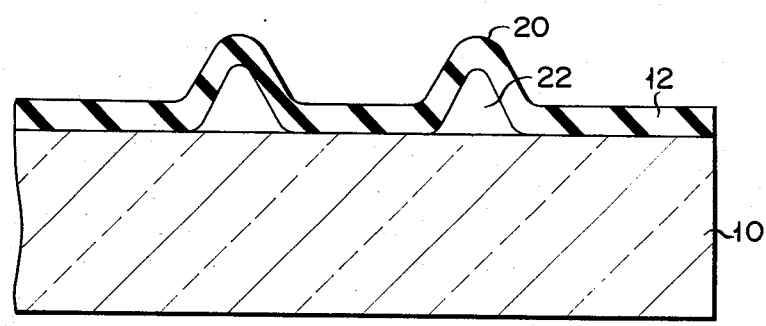
FIG. 2 is a sectional view of an optical disk having a recording layer which incurs local projections upon radiation of a write laser beam on the optical disk, thereby forming a protuberance.

A write laser beam pulsated by a known technique, and representing desired digital information irradiates the layer 12. The metal clusters 16 contained in the layer 12 absorb beam energy by optical absorption such that the metal clusters 16 are heated by absorption of the laser beam energy. The organic clusters 18 adjacent to the heated metal clusters 16 in the matrix 14 are also heated. These clusters 18 are evaporated and generate a gas. The matrix 14 (i.e., the layer 12) projects locally by a pressure of the gas, as shown in FIG. 2, and a protuberance 20 (to be called as a bubble) is formed. The portion represented by reference numeral 22 in FIG. 2 is a cavity formed by a local upward pushing of the layer 12 by the gas pressure, and a peeling of the layer 12 from the substrate 10. Information can be recorded by local projection of the layer 12.

After information is stored in the optical disk in the manner described above, information reproduction (i.e., information readout) is performed by using a read laser beam. The laser power (or laser intensity) of the read laser beam is about 1/5 to 1/10 of the write laser beam. When the read laser beam irradiates the layer 12 having the bubble 20, the intensity of light reflected by (or transmitted through) the bubble 20 differs from that reflected by a flat portion. The difference between the intensities of lights reflected by (or transmitted through) the bubble and the flat portion is detected by a known photosensor, such that original information represented by the bubble 20 can be reproduced. More particularly, in the region of the layer 12 which has the buble 20, the radiated read beam is diffracted in accordance with the shape of the bubble 20. The intensity of light reflected by the bubble 20 differs greatly from tht reflected by a nondeformed portion, i.e., the flat portion. The difference is detected and a reproduction output corresponding to the presence/absence of the bubble 20 is extracted. A reproduction signal having a high carrier-to-noise ratio (known as a CNR to those skilled in the art) can be obtained.

Careful attention should be paid to the following point. Irrespective of whether it is a write or a read beam, the laser beam can be incident on both the substrate 10 and the layer 12. When the write beam irradiates the layer 12 through the substrate 10, the metal clusters 16 located near the boundary between the recording layer 12 and the substrate 10 are heated, and a gas is emitted from the corresponding organic clusters 18. The matrix 14 can, therefore, acquire a local projection, as shown in FIG. 2. Conversely, when the write beam irradiates the layer 12 directly, the metal clusters 16 located near the exposed surface of the layer 12 are heated, and the gas is emitted therefrom. The matrix 14 can, therefore, acquire local projections in the same manner described above.

Materials constituting the layer 12 will be described in detail. When the recording medium is to be stored exposed to air, any humidity-resistant metal oxide can, in the interest of durability, be used for the layer 12. A preferable metal oxide can be selected from Groujp IIb metal oxides such as ZnO, Group IIIa metal oxides such as $Al_2O_3$, $In_2O_3$ and $Ga_2O_3$; Group IIIb metal oxides such as $Y_2O_3$, Group IVa metal oxides such as $SiO_2$, $GeO_2$ and $SnO_2$; rare earth metal oxides such as $La_2O_3$, $CeO_2$, $Sm_2O_3$, $Gd_2O_3$, $Tb_2O_3$ and $Dy_2O_3$; transition metal oxides such as $TiO_2$, $V_2O_5$, $Cr_2O_3$, $Mn_3O_4$, $MnO_2$, $Fe_2O_3$, CoO, NiO, CuO, $ZrO_2$, $Nb_2O_5$, $MoO_3$, $HfO_2$ and $Ta_2O_5$; or compound metal oxides thereof.

Any metal can be used in the matrix 14 as cluster 16 if it is not excessively active in air so as to effect longevity of the recording medium. When metal clusters are dispersed in the matrix, a metal having little light absorption can be used when a thin film is formed. The cluster metal can be selected from Group IIb metals such as Zn, Group IIIa metals such as Al, Ga and In; Group IIIb metals such as Y, Group IVa metals such as Si, Ge and Sn; Group Va metals such as Sb and Bi, Group VIa metals such as Te, or transition metals such as Ti, V, Cr, Mn, Fe, Co, Ni, Cu, Zr, Nb, Mo, Ru, Rh, Pd, Ag, Hf, Ta, W, Re, Os, Ir, Pt and Au.

Any organic material can be disposed in the matrix 14 if it is decomposed upon radiation of the write laser beam, i.e., if it can be present in a plasma. In general, an organic material is polymerized when it is introduced into a plasma. The organic material disposed in the matrix in the recording layer can be regarded as a polymer. Therefore, the organic material can be a polymer obtained by introducing an organic compound monomer into a plasma and dispersing it as a polymer, or a polymer dispersed in the matrix by plasma sputtering. A compound used as a monomer can be selected from a paraffin compound such as $CH_4$, $C_2H_6$ and $C_3H_8$; an olefin compound such as $C_2H_4$, a benzene, a silicon-containing compound such as $\{Si(CH_3)_3\}_2O$, or a nitrogen-containing compound such as amine and nitrile. The organic material used as the polymer can be selected from nylon, polycarbonate, teflon, vinyl chloride or epoxy resin.

According to the optical disk having the components described above, the layer 12 is not constituted by an organic layer, but by mixing the organic clusters 18 in the metal oxide layer serving as the matrix 14. The metal clusters 16 having a light absorption property are also dispersed in the metal oxide layer 14. With respect to the described optical disk, the margin of incident laser beam power can be increased for the following reason. Even if a laser beam having a higher power than that of the standard laser beam irradiates the layer 12, the layer 12 will not burst, unlike a conventional optical disk having an organic recording layer wherein an excessive amount of generated gas bursts the recording layer so that pits are formed when the incident beam power slightly exceeds the laser beam limit level. According to the optical disk of the present invention, even when the incident beam power exceeds the laser beam level limit and the clusters 18 contained in the matrix 14 are evaporated excessivelyl, the matrix 14 will not burst. This is because the matrix 14 used as the base of the recording layer is thermally and chemically stable and has a higher mechanical strength (durability) than that of an organic layer. Therefore, the upper limit level of the laser intensity need be only roughly determined, resolving the conventional problem that required strict design of the laser generator in the interest of preventing deleterious variations in energy level.

Figure 3:
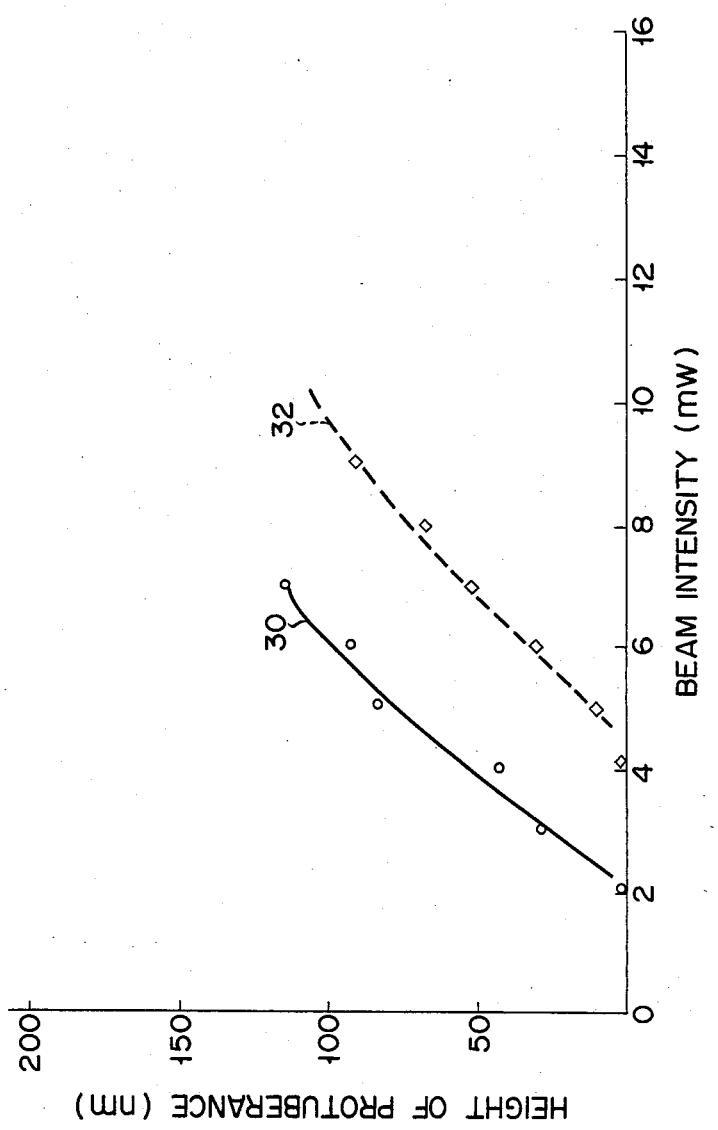
FIG. 3 is a graph showing the change in height of a protuberance as a function of the change in intensity of the write beam, wherein a solid curve 30 represents a change in height of a protuberance when the write beam irradiates the recording layer 12 through a transparent substrate 10, and a broken curve 32 represents a change in a protuberance when the write beam irradiates the recording layer 12 directly.

FIG. 3 is a graph showing the change in height of the protuberance formed on the recording layer as a function of the change in beam intensity. A solid curve 30 represents the change in height of the protuberance when the write beam irradiates the layer 12 through the substrate 10. A broken curve 32 represents the change in height of the protuberance when the write beam irradiates the layer 12 directly. The wavelength of the laser beam was 633 nm. Even when the write beam irradiates the layer 12 through the substrate 10, the layer 12 bursts when the beam intensity reaches 8 mW, as is apparent from FIG. 3. This indicates that the upper limit level of the laser intensity can be increased up to 8 mW. The height of the protuberance was as high as $0.17\lambda$ when the wavelength of the laser beam was $\lambda$. This height was, in practice, of a sufficient level for the optical disk. The height of the protuberance can be changed freely by controlling the incident beam power.

According to the optical disk of the present invention, by controlling the content of the clusters 16 in the matrix 14 in the layer 12, the light absorption, with respect to the beam intensity of the laser beam, can be easily controlled. The control of the content of the clusters 16 can be easily practiced during the manufacturing process. The light absorption of mass-produced optical disks can be improved, and a high recording sensitivity can be easily provided. Similarly, by controlling the content of the clusters 18 in the matrix 14 of the layer 12, the amount of gas produced from the layer 12 upon radiation of the predetermined laser beam can be easily controlled. The recording characteristics of optical disks to be mass-produced can be updated variously under given conditions. When the content of the clusters 18 is properly determined, the desired shape of the bubble 20 can be obtained.

Figure 4:
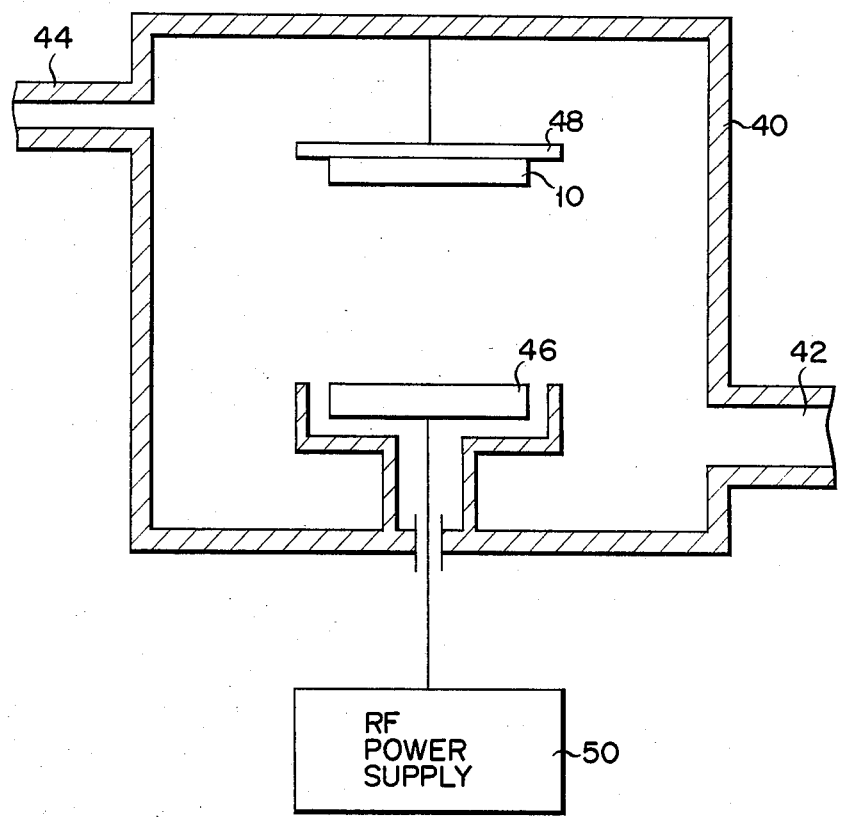
FIG. 4 is a schematic diagram of a plasma sputtering apparatus for forming the recording layer of the optical disk shown in FIG. 1.

A method of manufacturing the optical disk described above will be described hereinafter. FIG. 4 shows, schematically, a plasma sputtering apparatus for forming the layer 12 of the optical disk. An envelope 40 is evacuated by a known vacuum pump (not shown) through a drain port 42, and is kept in a vacuum. A gas inlet port 44 is formed in the envelope 40. Two electrodes 46 and 48 oppose each other in the envelope 40. The electrode 46 serves as a target electrode to which RF power is supplied from an RF power supply 50. The electrode 48 serves as an electrode for placing the substrate thereon. A glass substrate 10 for the optical disk is placed on the electrode 48.

Figure 5:
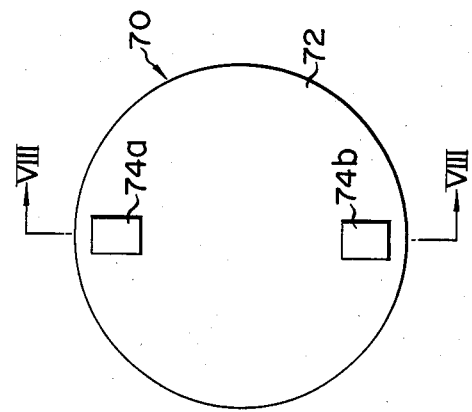
FIG. 5 is a plan view of a target body used when the recording layer is formed on the substrate by the plasma sputtering apparatus of FIG. 4.

When the layer 12 is formed on the substrate 10, a target 52, shown in FIG. 5, is connected to the electrode 46. The target 52 comprises a disk-like base layer 54 of a metal oxide such as $SiO_2$, two metal (e.g., Ag) pellets 56a and 56b, and two organic pellets 58a and 58b formed on the layer 54. The pellet 56 is made of silver, and the pellet 58 is made of a resin such as teflon. The pellets 56a and 56b are located in the peripheral portion of the base layer so as to oppose each other. The pellets 58a and 58b are also located in the peripheral portion of the base layer so as to oppose each other. The four pellets are located in a cross shape as illustrated so as to improve uniformity of the recording layer.

Figure 6:
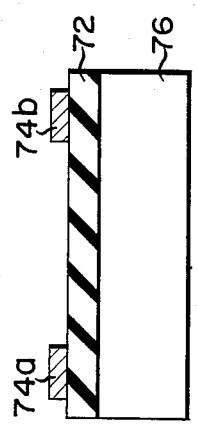
FIG. 6 is a sectional view of the target body taken along the line VI—VI of FIG. 5.

FIG. 6 shows a sectional structure of the target 52 taken along the line VI—VI of FIG. 5. A plate (to be referred to as a backing plate) 60 is formed on the rear surface of the layer 54. The number of pellets 56a, 56b, 58a and 58b is determined in accordance with the desired contents of clusters 16 and 18 of the layer 12. In this embodiment, since the content of the organic clusters 18 is, preferably, equal to that of the metal clusters 16 in the recording layer 12, the two metal pellets 56a and 56b, and the two organic pellets 58a and 58b are used. However, when the contents of one of the clusters 16 and 18 exceeds that of the other, the number of corresponding pellets can be changed accordingly.

After the envelope 40 is evacuated to a vacuum of $10^{-6}$ Torr, a rare gas such as argon (Ar) is introduced into the envelope 40 through the port 44. The flow rate of the gas is controlled such that the internal pressure of the envelope 40 is set to be $10^{-3}$ to $10^{-2}$, e.g., $10^{-2}$ Torr. Under this condition, 13.56 MHz RF power is supplied from the generator 50 to the electrode 46, and a plasma is generated between the electrodes. $SiO_2$ molecules are, consequently, emitted from the metal oxide layer 54 to the substrate 10. At the same time, silver atoms and teflon molecules are emitted from the pellets 56 and 58, respectively, to the substrate 10. These particles are deposited on the substrate 10 placed on the electrode 48. The layer 12, having an $SiO_2$ matrix uniformly containing silver and teflon clusters, is formed on the substrate 10. The $SiO_2$ matrix and the silver and teflon clusters are formed by surface migration of emitted molecules and atoms. The substrate 10 is, preferably, rotated at an equal speed on an identical plane during plasma sputtering. As a result, a uniform recording layer 12 can be formed on the substrate 10.

Figure 7:
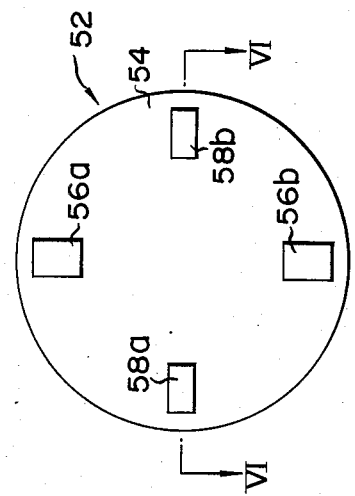
FIG. 7 is a plan view showing another target used when a recording layer is formed on the substrate by the plasma sputtering apparatus of FIG. 4.
Figure 8:
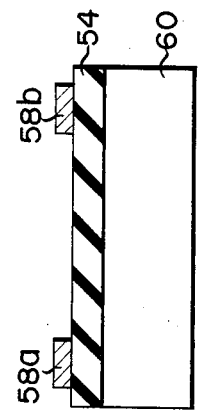
FIG. 8 is a sectional view showing the target body taken along the line VIII—VIII of FIG. 7.

FIGS. 7 and 8 show a modification of a target used when the layer 12 is formed by plasma sputtering. According to the target 70 shown in FIG. 7, a disk-like target layer 72 of a metal oxide such as CoO can be used. Two metal pellets 74a and 74b of indium (In) are formed on the layer 72. The pellets 74a and 74b are located in the peripheral portion of the target surface so as to oppose each other. As shown in FIG. 8, the plate 76 is formed on the rear surface of the target layer 72. The number of indium pellets 74a and 74b is properly determined in accordance with the content of clusters in the metal oxide matrix in the layer 12.

A method of forming the layer 12 of FIGS. 7 and 8 on the substrate 10 by plasma sputtering will be described hereinafter. The electrode 46 in the envelope 40 of FIG. 4 is connected to the target 70, and the envelope 40 is evacuated. A gas mixture of a monomer compound gas such as $CH_4$ and a rare gas such as argon (AR) is supplied to the envelope 40 through the port 44. When a plasma is generated by using RF power in the same manner as described above, a metal oxide matrix containing indium clusters and organic clusters of a polymer derived from a monomer compound gas (i.e., the recording layer) is deposited on the substrate 10 opposite the target 70. It should be noted that the recording layer is formed on the substrate 10 by a single sputtering process.

According to the manufacturing method described above, the contents of the metal and organic clusters contained in the metal oxide layer can be easily and accurately controlled. Therefore, a recording layer having a desired light absorption coefficient and proper protuberance efficiency can be manufactured. The light absorption coefficient of the recording layer can be set at a proper value falling within the range of 5% to 90%. In the case of the information recording medium of the present invention, light reflectivity decreases when the light absorption coefficient is increased. Reflected light, instead of transmitted light, is used, in practice, for reproducing information. It is preferable that the light absorption coefficient be about 50%, and the light reflectivity be about 40%. For this purpose, a volume ratio of metal cluster to the metal oxide matrix should, preferably, be 10% or more.

The fact that the content of the organic clusters contained in the metal oxide layer can be easily and accurately controlled indicates that the total amount of gas generated from the layer 12 upon radiation by the write laser beam can be properly adjusted, and that the bubble 20 can be desirably shaped. When the content of the organic clusters and the amount of gas generated from the layer 12 are insufficient, the intensity of read light reflected by (transmitted through) the bubble 20 does not differ greatly from that reflected by the flat portion. In this case, a reproduction output signal having a high carrier-to-noise ratio, i.e., CNR, cannot be expected. However, when the content of the organic clusters and the amount of gas generated from the layer 12 are excessive, the recording layer tends to burst when the write laser beam intensity varies. Based on the above assumptions, it is preferable that the content of the organic clusters in the recording layer not exceed the overall volume of the metal oxide matrix, and have a volume ratio of 5% or more with respect to the matrix.

The metal cluster size contained in the layer 12 is, preferably, small. When the cluster size is small, the shape of the bubble 20 can be accurately controlled. In other words, high-density recording can be performed. For this reason, the metal cluster size is set at 50 nm or less. When the method described above is employed, the metal cluster size can easily be formed at 50 nm or less. Metal atoms emitted by plasma sputtering to the substrate 10 migrate and will not grow into large particles since metal oxide molecules and organic molecules (radicals) are also emitted onto the substrate surface. As a result, the metal cluster size is kept at substantially 50 nm or less.

The present invention will be described in detail by way of Examples.

EXAMPLE 1

An RF (radio-frequency) diode plasma sputtering apparatus having an 8" $SiO_2$ target was used. A plurality of Ag pellets occupying 30% of the total area of the target, and a plurality of teflon pellets occupying 10% of the total area of the target were placed on the target. A glass substrate was placed on the counter electrode. The envelope of the sputtering apparatus was evacuated to a vacuum of $1 \times 10^{-5}$ Torr. Ar gas was supplied to set an internal pressure of the envelope at $2 \times 10^{-2}$ Torr. 400-W RF power (13.56 MHz) was supplied to the opposing electrodes to generate a plasma. And a recording layer was formed on the substrate to a thickness of 100 nm after 10 minutes.

The prepared information recording medium was rotated at a speed of 600 rpm. Pulsed laser beam spots, as the write laser beam, having a size of 1 μm and an output of 10 mW, repeatedly irradiated the recording layer through the substrate from a GaAlAs semiconductor layer diode (oscillation wavelength of 830 nm) at a repetition frequency of 8 MHz. A continuous laser beam, as the read laser beam, having an output of 0.5 mW irradiated the recording layer. Light reflected by the recording layer was detected. A CNR of the reproduction output was as high as 60 dB.

When a scanning type electron microscope was used to observe the recording layer surface of the recorded information recording medium, each bubble was found to have a size of about $2 \times 1$ μm at the bottom thereof, and a height of about 50 nm.

As a comparison, a recording layer was formed under the same conditions as in Example 1, except that the teflon pellets were not formed on the $SiO_2$ target to prepare an information recording medium. Recording was then performed. No bubbles were, however, formed on the recording layer.

EXAMPLE 2

An RF diode plasma sputtering apparatus having an 8" $Y_2O_3$ target was used. A plurality of Bi pellets occupying 40% of the total area of the $Y_2O_3$ target were placed thereon. A glass substrate was placed on the counter electrode. A gas mixture was supplied at a flow rate ratio of $O_2/CH_4/Ar = 10/40/50$ to set the internal pressure of the envelope at $5 \times 10^{-2}$ Torr. 500-W RF power (13.56 MHz) was supplied to the opposing electrodes to generate a plasma. A recording layer was formed on the substrate to a thickness of 50 nm after 10 minutes.

The prepared information recording medium was rotated at a speed of 600 rpm in the same manner as in Example 1. A laser beam, as the write beam, irradiated the recording layer through the substrate from a GaAlAs semiconductor laser diode (oscillating wavelength of 830 nm) of an output of 10 mW and a pulse width of $\frac{1}{8}$ MHz, to perform recording. Each bubble was found to have a size of about $2 \times 1$ μm at the bottom thereof, and a height of about 60 nm.

A recording layer was deposited on halite under the same conditions as Example 2 and, subsequently, peeled from halite. The resultant recording layer was observed by a transmission electron microscope. Bi clusters were found to be uniformly dispersed in the $Y_2O_3$ matrix. The size of the Bi clusters was about 300 Å. The deposition ratio of Bi clusters in the $Y_2O_3$ matrix was about 50%. Thermogravimetric analysis was performed on powder obtained from the prepared recording layer and an exothermic reaction was found to correspond to gas emission at a temperature of 200° C.

EXAMPLE 3

An RF diode plasma sputtering apparatus having an 8" $Al_2O_3$ target was used. A plurality of Ti pellets corresponding to 40% of the total area of the $Al_2O_3$ target, and a plurality of nylon pellets corresponding to 15% thereof were placed on the $Al_2O_3$ target. A glass substrate was placed on the counter electrode. Ar gas was supplied to the envelope to set its internal pressure at $5 \times 10^{-2}$ Torr. 400-W RF power (13.56 MHz) was supplied to the opposing electrodes to generate a plasma, thereby depositing a recording film.

Recording was performed under the same conditions as in Example 1. Bubbles were observed by a scanning electron microscope. Each bubble was found to have a size of about $1.5 \times 1$ μm at the bottom thereof, and a height of about 0.4 nm.

V, Cr, Mn, Fe, Co, Ni and Cu pellets sequentially replaced the Ti pellet over 50% of the target area to prepare seven information recording media under the same conditions as in Example 3. Recording was performed under the same conditions as in Example 3, and resultant bubbles were observed. Satisfactory bubbles were found to be formed in the respective media.

Although the present invention has been shown and described with reference to particular embodiments, various changes and modifications which are obvious to a person skilled in the art, and to which the invention pertains, are deemed to lie within the scope of the invention.

The matrix of the recording layer comprises a metal oxide in the above embodiment, but is not limited to this. The recording layer matrix must be thermally and chemically stable, have a high mechanical strength and project upwards upon generation of a gas from the organic clusters. The matrix can, therefore, be made of a metal nitride or metal carbonate to obtain the same effect as in the above embodiment.

According to the optical disk of the first embodiment of the present invention, the matrix is made of a metal oxide. However, since the matrix must be thermally and chemically stable, the material for the matrix need not be limited to a metal oxide. According to second and third embodiments to be described below, the matrices of the recording layers comprise metal nitride and carbonate, respectively.

Figure 9:
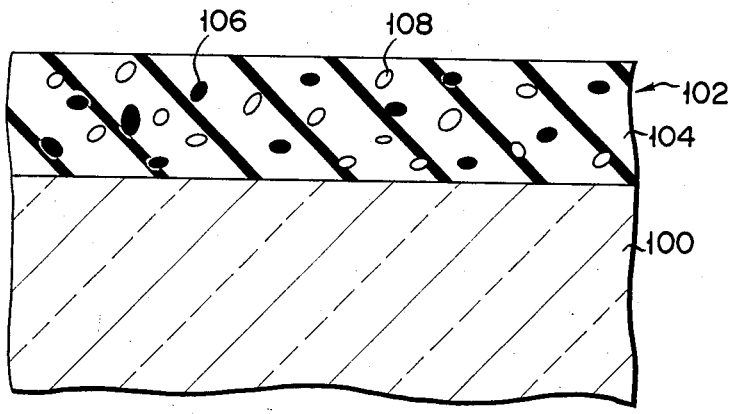
FIG. 9 is a diagram of the main part, showing a section of an optical disk according to a second embodiment of the present invention.

FIG. 9 shows the sectional structure of the main part of an optical disk according to a second embodiment of the present invention. A substrate 100 comprises a disk-shaped body of a transparent material such as glass or organic resin (e.g., acrylic resin or polycarbonate resin). The substrate 100 can be made of a metal such as aluminum in accordance with specifications of the information recording apparatus. A single recording layer 102 is formed on the substrate 100. The layer 102 is comprised of a metal nitride matrix 104 containing metal clusters 106 for absorbing beam energy, and organic clusters 108 for emitting a gas component.

In order to achieve longevity of the recording medium when it is stored in air, any metal nitride which withstands humidity in air can be used for the recording layer 102. A preferable metal nitride can be selected from Group III metal nitrides such as BN, AlN, GaN and InN; Group IV metal nitrides such as $Si_3N_4$ and $Ge_3N_4$, or transition metal MN nitrides such as TiN, ZrN, HfN, Vn, NbN, TaN and CrN.

Any metal nitride can be used for the metal clusters 106 when it is not excessively active in air, so as to achieve longevity of the recording medium. When the metal nitride is clustered in a metal nitride matrix 104, a metal having a small light absorption coefficient in a continuous thin film form can be used. Such a metal can be selected from Group Ib metals such as Cu, Ag and Au; Group IIb metals such as Zn, Group IIIa metals such as Y, rare earth metals such as La and Ce, Group IIIb metals such as Al, Ga and In; Group IVb metals such as Si, Ge and Sn; Group Vb metals such as Sb and Bi, Group VI metals such as Se and Te, or transition metals such as Ti, V, Cr, Mn, Fe, Co, Ni, Zr, Nb and Mo.

An organic material dispersed in the metal nitride matrix has a property for generating gas pressure upon radiation by the write laser beam, i.e., the organic material can be present in a plasma. Under this assumption, any organic material can be used. In general, an organic material is polymerized when introduced into a plasma. The organic material dispersed in the matrix in the recording layer can be regarded as a polymer. Therefore, the organic material can be a polymer obtained by introducing an organic compound monomer in a plasma and dispersing it as a polymer, or a polymer dispersed in the matrix by plasma sputtering. A compound used as a monomer can be selected from a paraffin compound such as $CH_4$, $C_2H_6$ and $C_3H_8$; an olefin compound such as $C_2H_4$, an aromatic group such as benzene, a silicon-containing compound such as $\{Si(CH_3)_3\}_2O$ or a nitrogen-containing compound such as amine and nitrile. The organic material used as the polymer can be selected from teflon, nylon, polycarbonate, vinyl chloride or epoxy resin.

A method of manufacturing an optical disk of the second embodiment of the present invention will be described heeinafter. The optical disk of the second embodiment, using a metal nitride constituting a matrix 104 of a recording layer 102, can be manufactured by the plasma sputtering apparatus shown in FIG. 4.

Figure 10:
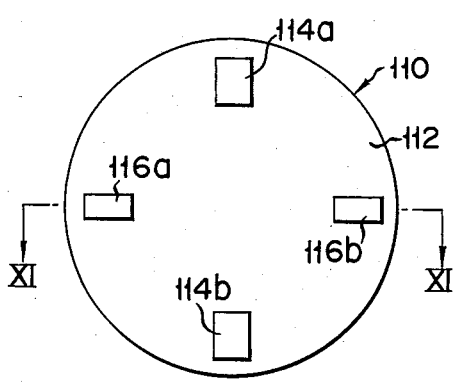
FIG. 10 is a plan view of a target body used when the recording layer of the optical disk of the second embodiment of FIG. 9 is formed by the plasma sputtering apparatus of FIG. 4.
Figure 11:
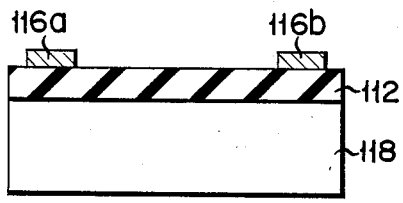
FIG. 11 is a sectional view of the target body taken along the line XI—XI of FIG. 10.

When the layer 102 described above is formed on the substrate 100, a target 110 shown in FIG. 10 is connected to the electrode 46. The target 110 has a target layer 112 of a metal nitride such as $Si_3N_4$. Two metal (e.g., Cu) pellets 114a and 114b are formed on the target layer 112. Two organic pellets 116a and 116b of a resin such as teflon are formed on the layer 112. The number of pellets 114a, 114b, 116a and 116b is determined in accordance with the desired contents of the clusters 106 and 108. As is apparent from FIG. 11, showing the sectional structure of the target 110 taken along the line of XI—XI, a backing plate 118 is formed on the lower surface of the layer 112.

The envelope 40 is evacuated to a vacuum of about $10^{-6}$ Torr, and a rare gas such as argon is supplied to the envelope 40 through the port 44. The flow rate of the rare gas is selected such that the internal pressure of the envelope 40 is set at $10^{-3}$ to $10^{-2}$, e.g., $10^{-2}$ Torr. Under these circumstances, RF power of 13.56 MHz is supplied from the generator 50 to the electrode 46, and a plasma is generated between the electrodes. The recording layer 102 containing prescribed contents of metal and organic clusters in the matrix 104 is formed on the substrate 100 placed on the counter electrode 48. In this case, the substrate 100 is rotated at, preferably, a constant speed on an identical plane so as to improve uniformity of the recording layer 102.

Figure 12:
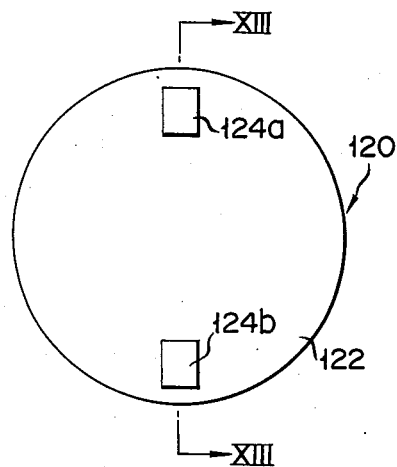
FIG. 12 is a plan view showing a modification of the target body of FIG. 10.
Figure 13:
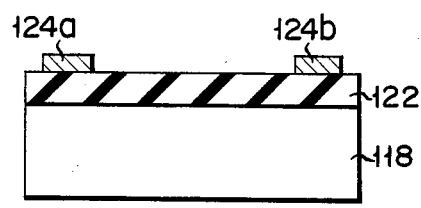
FIG. 13 is a sectional view of the target body of FIG. 12, taken along the line XIII—XIII of FIG. 12.

FIGS. 12 and 13 show another target. According to the target 120 of FIG. 12, a target layer 122 of a metal nitride such as TiN which is formed on the plate 118, is used. Two metal pellets 124a and 124b of tellurium are formed on the layer 122 so as to oppose each other. The number of pellets 124a and 124b is determined in accordance with the content of the metal clusters in the matrix 104.

A method of manufacturing the recording layer on the substrate 100 by using the target 120 of FIGS. 12 and 13 will be described hereinafter. The target 120 is connected to the electrode 46 in the envelope 40 of FIG. 4. A gas mixture of a monomer compound gas such as $CH_4$ and a rare gas such as argon (Ar) is supplied to the envelope 40 through the port 44. Subsequently, when a plasma is generated by using the RF power in the same manner as described above, tellurium clusters and organic clusters constituted by a polymer obtained from the monomer compound gas are uniformly dispersed in the metal nitride matrix (i.e., the recording layer) which is formed on the substrate 100. It should be noted that the recording layer is formed on the substrate 100 by a single plasma sputtering process.

According to the method of forming the recording layer as described above, the contents of the metal and organic clusters in the metal oxide layer can be easily and accurately controlled. Therefore, a recording layer having a desired light absorption coefficient and a proper deformation rate can be easily manufactured. The light absorption coefficient of the recording layer can be arbitratily set to fall within the range of 5% to 90%.

In the recording media obtained in the first and second embodiments, the light absorption coefficient can be controlled by the content of the metal clusters within the range of 5 to 90%. In the information recording media of the present invention, when the light absorption coefficient is increased, the reflectivity is found to decrease. Since it is preferable that recording/reproduction be performed by utilizing the reflected light, the absorption coefficient is, preferably, about 40%, and the reflectivity is, preferably, about 50%. For this purpose, the content of the metal clusters in the matrix should be in the range of 10% to 70%.

In the information recording medium of the present invention, the shape of the bubble depends on the content of the organic material. When the content of the organic material is small and the gas pressure is excessively low, a sufficiently large optical concentration change occurs in the read light. In other words, a bubble having a large CNR signal cannot be formed. However, when the content of the organic material is excessively large and the bubbles burst as a result of the gas pressure, good CNR characteristics cannot be obtained. The content of the organic material must not exceed the volume of the metal nitride matrix, and preferably, at least 5% organic material should be contained in the metal nitride matrix.

The metal cluster size is, preferably, small. In this case, the resolution is improved to achieve high-density recording. When a laser beam spot is about 1 to 2 $\mu$m, the metal cluster size is, preferably, 100 nm or less (1/10 or less of the beam spot size). In the manufacturing process of the present invention, metal atoms, metal nitride molecules and organic molecules fly to the substrate. Metal atoms will not grow into particles while the metal nitride and organic molecules are emitted to the substrate. Therefore, the metal clusters can be easily controlled to be 100 nm or less in size.

The thickness of the recording layer is less than 400 and, preferably, 300 nm, so as not to degrade recording sensitivity. The lower limit of the film thickness is 5 nm so as to prevent resolution degradation accompanied by island deposition of the recording layer.

The present invention will be described in detail by way of examples.

EXAMPLE 4

An RF diode sputtering apparatus having an 8" $Si_3N_4$ target was used. A plurality of In pellets corresponding to 20% of the total area of the $Si_3N_4$ target, and a plurality of teflon pellets coresponding to 10% of the total area thereof were placed on the target. A glass substrate was placed ont he counter electrode having a diameter of 8" and a thickness of 1.5 mm. The envelope was evacuated to a vacuum of $1 \times 10^{-6}$ Torr, and Ar gas was supplied to set the internal pressure of the envelope at $2 \times 10^{-2}$ Torr. 300-W RF power (13.56 MHz) was supplied between the opposing electrodes to generate a plasma. A recording film was formed on the substrate to a thickness of 100 nm after 10 minutes.

The prepared recording medium was rotated at a speed of 600 rpm. A laser beam having a spot size of 1.5

μm, an output of 13 mW and a pulse width of 200 nsec irradiated the recording layer through the substrate from a GaAlAs semiconductor laser (wavelength of 830 nm) to perform recording. A continuous beam, having an output of 0.5 mW, irradiated the recording layer through the substrate. As a result, a CNR of the reproduction output was as high as 45 dB.

When the recording medium was observed by a scanning electron microscope, bubbles, each having a size of about 2×1 μm at the bottom, and a height of about 20 nm, were formed on the recording layer.

As a comparative example, a thin film was formed under the same conditions as in Example 4, except that teflon pellets were not formed on the target. Even after recording was performed, no bubbles were formed thereon.

The recorded medium was exposed in a thermostat having a temperature of 70° C. and a relative humidity of 85%, for 10 days. The surface of the recording medium was observed by the electron microscope after an accelerated degradation test. No pinholes were formed in the recording layer. Reflectivities at a wavelength of 830 nm were measured before and after the test. The reflectivity was decreased by less than 10% after the test.

EXAMPLE 5

The same sputtering apparatus as in Example 4, but provided with an 8" AlN target, was used. A plurality of Te pellets corresponding to 40% of the total area of the AlN target were placed thereon. A gas mixture was supplied at a flow rate ratio of $CH_4/Ar=30/70$ to set the internal pressure of the envelope at $5\times10^{-2}$ Torr. 300-W RF power was supplied across the opposing electrodes to generate a plasma. A recording layer was deposited on the glass substrate to a thickness of 70 nm after 8 minutes.

In the same manner as in Example 4, recording/reproduction characteristics were examined. The CNR of a reproduced signal, upon radiation by a write laser beam of an energy level of 10 mW×500 nsec, was 45 dB.

A thin film formed on a KBr substrate under the same conditions as in Example 5 was peeled from the substrate. The resultant layer was observed by a transmission electron microscope. Clusters of the metal tellurium were found to be uniformly dispersed in the AlN matrix. The Te cluster size was about 10 nm and was 50% by volume with respect to the AlN matrix. The thin film was granulated to powder and the gas components were mass analyzed while the powder was heated. $CH_3$ and $CH_2$ (molecular weights of 15 and 14, respectively) were dissociated at a temperature of about 130° C. due to decomposition of the polymer.

EXAMPLE 6

The information recording medium of the present invention can be used as a mother with pregrooves.

A recording layer was deposited on a glass substrate having a thickness of 8 mm and a diameter of 350 mm, in the same manner as in Example 4. The film thickness was 150 nm.

The prepared information recording medium was rotated at a speed of 300 rpm, and an Ar laser beam was scanned along the radial direction while the laser beam directly irradiated the recording layer. The Ar beam comprised a continuous beam and had an intensity of 8 to 12 mW for intensity modulation in accordance with the medium format signal. A continuous spiral bubble having a width of 0.3 to 0.8 μm and a height of 50 to 100 nm was formed on the surface of the recording layer.

Figure 14A:
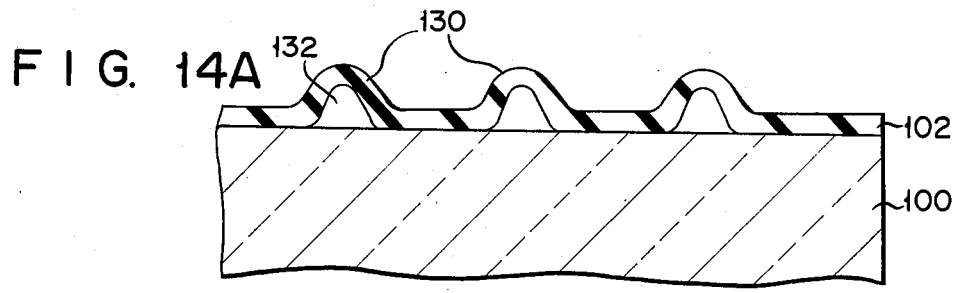
FIGS. 14A to 14D are sectional views illustrating the steps in manufacturing a stamper structure by using the mother of the optical disk of the second embodiment.

When a write laser beam irradiates the optical mother disk constituted by the substrate 100 and the recording layer 102 of a metal nitride base layer, the metal clusters contained in the layer 102 absorb laser energy while the organic clusters emit a gas component to induce formation of local projections in the metal nitride base layer (i.e., the metal nitride matrix). As shown in FIG. 14A, a plurality of protuberances (i.e., bubbles) are formed on the surface of the optical disk in accordance with recording information. In this embodiment, since the pulsed laser beam was emitted toward the recording layer 102 while the optical disk was being rotated and the beam was radially scanning the disk, bubbles 130 were formed in a spiral shape. Referring to FIG. 14A, reference numeral 132 denotes a cavity obtained through the production of local projections of the recording layer 102 by the pressure of the gas emitted therefrom, and by peeling a layer portion from the substrate 100.

Figure 14B:
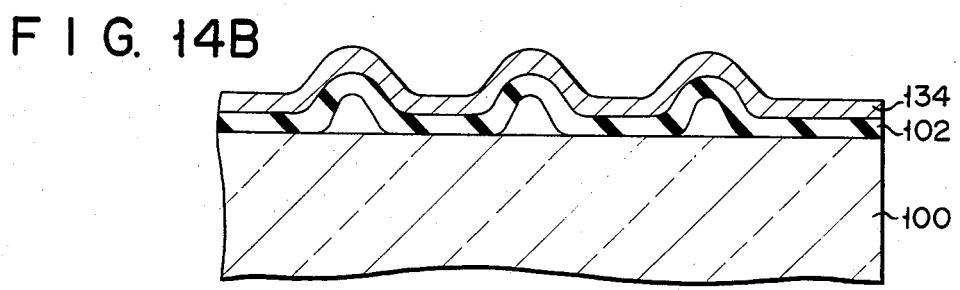
Figure 14C:
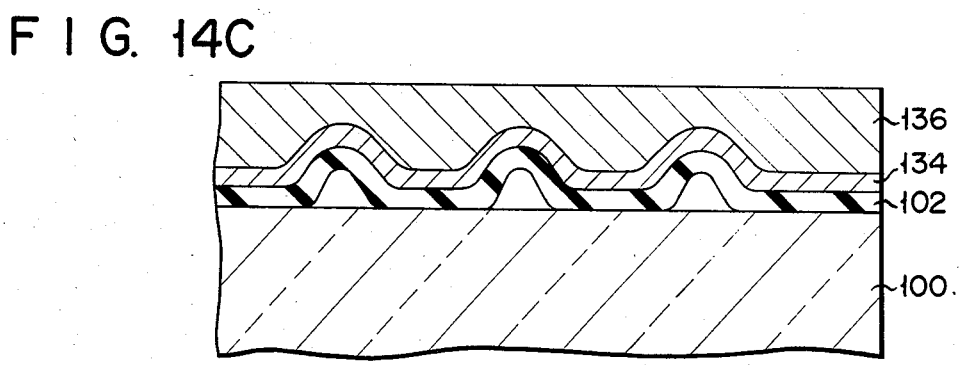

A method of manufacturing a stamper structure by using the optical mother disk of FIG. 14A, when play only optical disks are mass produced, will now be described. A thin metal film 134 (See FIG. 14B) is formed by sputtering on the recording layer of the optical mother disk recorded with information as described above. The film 134 can be a gold film of 20 nm thickness. Sibsequently, electroforming is performed using the film 134 as an electrode, thereby forming a nickel (Ni) layer 136 on the film 134 to a thickness of 300 μm, as shown in FIG. 14C. The layer 136 serves as a stamper structure substrate.

Figure 14D:
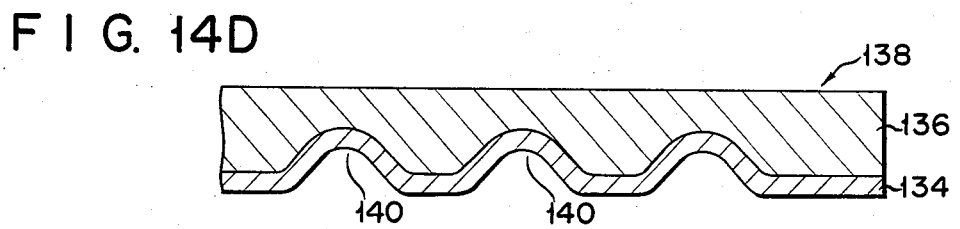

When the film 134 is properly peeled from the layer 102 by a known electrolytic washing technique, a stamper structure 138 consisting of the substrate 136 and the film 134 shown in FIG. 14D is obtained. The protuberances of the optical mother disk are accurately copied on the film 134 of the structure 138. In other words, the film 134 has recesses 140 properly corresponding to the pattern of the protuberances 130. When the structure 138 is used for injectio-molding of an acrylic resin, an acrylic substrate (not shown) having substantially the same pattern configuration as that of the recording layer 102 is formed. The acrylic substrate serves as the play only optical disk. When the surface of the acrylic substrate was observed by a scanning electron microscope, the same protuberances as those of the mother disk 130 of FIG. 14A were found to have been formed on the acrylic substrate. A thin aluminum film was deposited on the acrylic substrate, and tracking characteristics of the resultant structure were measured. As a result, the tracking modulation was as high as 0.2.

Figure 15:
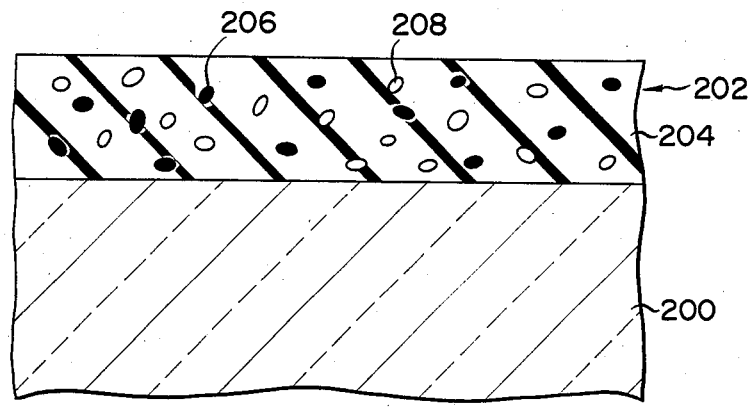
FIG. 15 is a sectional view showing the main part of the optical disk according to a third embodiment of the present invention.

FIG. 15 shows the sectional structure of the main part of an optical disk according to a third embodiment of the present invention. This optical disk has the same effect as that of the above embodiments. A disk-shaped substrate 200 comprises a transparent material such as glass or organic resin (e.g., acrylic resin or polycarbonate resin). A recording layer 202 is formed on the substrate 200. The layer 202 comprises a metal carbide base layer 204 containing metal clusters 206 for absorbing beam energy, and organic clusters 208 for emitting a gas component.

Since the recording medium is stored in air, any metal carbide which can withstand moisture in air can be used for the recording layer 202 so as to ensure longevity of the recording medium. A preferable metal carbide can be selected from covalent carbide (e.g., SiC and $B_4C$), interstitial carbides such as MC type carbides (e.g., TiC, ZrC, HfC, VC, NbC, TaC, MoC and WC) of $MC_2$ type carbides (e.g., $VC_2$, $TaC_2$, $MoC_2$ and $WC_2$).

Any metal can be used for the metal clusters 206 dispersed in the metal carbide matrix 204 so long as it is not excessively active in air, in order to guarantee longevity of the recording medium. A noble metal having a small light absorption coefficient in a continuous thin film form can be dispersed as the metal clusters 206 in the metal carbide matrix 204. More particularly, a preferable metal to be dispersed as the metal clusters 206 in the matrix 204 can be selected from Group Ib metals such as Cu, Ag and Au; Group IIb metals such as Zn, Group IIIa metals such as Y, rare earth metals such as La and Ce, Group IIIb metals such as Al, Ga and In; Group IVb metals such as Si, Ge and Sn; Group Vb metals such as Sb and Bi, Group VIb metals such as Se and Te, or transition metals such as Tl, V, Cr, Mn, Fe, Co, Ni, Zr, Nb and Mo.

An organic material dispersed in the metal carbide matrix 204 must have a property of generating a gas pressure upon radiation by the write laser beam, i.e., the material must be capable of being present in a plasma. Under this assumption, any metal can be used. In general, the organic compound tends to be polymerized in a plasma. The organic material dispersed in the matrix in the recording layer can be regarded as a polymer. Therefore, the organic material can be a polymer obtained by introducing an organic compound monomer into a plasma and dispersing it as a polymer, or a polymer dispersed in the matrix by plasma sputtering. A compound used as a monomer can be selected from a paraffin compound such as $CH_4$, $C_2H_6$ and $C_3H_8$; an olefin compound such as $C_2H_4$, an aromatic group such as benzene, a silicon-containing compound such as $\{Si(CH_3)_3\}_2O$ or a nitrogen-containing compound such as amine and nitrile. The organic material used as the polymer can be selected from teflon, nylon, polycarbonate, vinyl chloride or epoxy resin.

Figure 16:
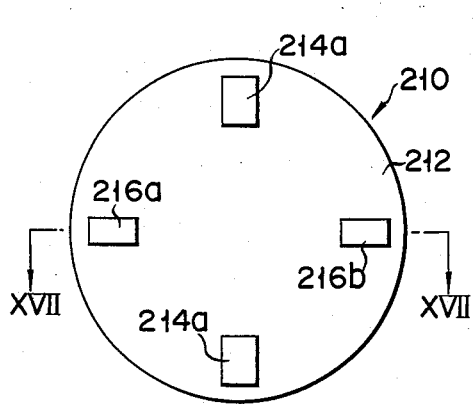
FIG. 16 is a plan view of a target body used when a recording layer of the optical disk of the third embodiment of FIG. 15 is formed by the plasma sputtering apparatus of FIG. 4.
Figure 17:
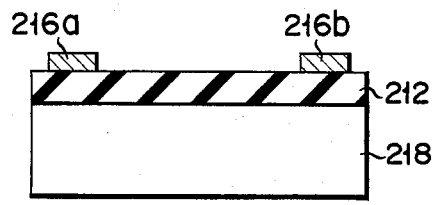
FIG. 17 is a sectional view of the target body taken along the line XVII—XVII of FIG. 16.

A method of manufacturing the optical disk according to a third embodiment of the present invention will be described hereinafter. The plasma sputtering apparatus of FIG. 4 can be used to manufacture the optical disk of the third embodiment in which the matrix of the recording layer is made of a metal carbide. The target 210 of FIG. 16 is connected to the electrode 46. The target 210 has a target layer 212 of a metal carbide such as SiC. Two metal (Cu) pellets 214a and 214b are formed on the target layer 212. Two organic pellets 216a and 216b of a resin such as teflon are formed on the target layer 212. The number of pellets 214a, 214b, 216a and 216b is determined in accordance with the desired contents of metal clusters 206 and organic clusters 208. As is apparent from FIG. 17, showing the sectional structure of the target 210 taken along the line XVII—XVII, a backing plate 218 is formed on the lower surface of the layer 212.

The envelope 40 is evacuated to a vacuum of about $10^{-6}$ Torr, and a rare gas such as argon (Ar) gas is supplied to the envelope 40 through the port 44. The gas is supplied such that the internal pressure of the envelope 40 is set at $10^{-3}$ to $10^{-2}$ Torr, e.g., $10^{-2}$ Torr. Under this condition, 13.56-MHz RF power is supplied from the generator 50 to the electrode 46 to generate a plasma between the opposing electrodes. A recording layer 202 having a metal nitride base layer 204 containing metal and organic clusters in predetermined contenst is formed on a substrate 200 placed on the counter electrode 48. During plasma sputtering, the substrate 200 is rotated at, preferably, a constant speed and within an identical plane.

Figure 18:
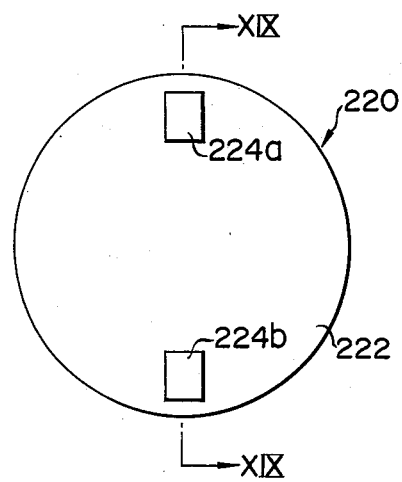
FIG. 18 is a plan view showing a modification of the target body of FIG. 16.
Figure 19:
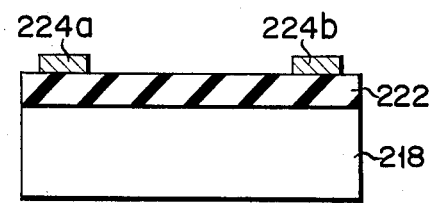
FIG. 19 is a sectional view of the target body taken along the line XIX—XIX of FIG. 18.

FIGS. 18 and 19 show yet another target. According to the target 220 shown in FIG. 18, a target layer 222 of a metal carbide such as TiC, formed on the plate 218, is used. The layer 222 has two metal pellets 224a and 224b of tellurium (Te) on the layer 222 at opposite positions. The number of pellets 224a and 224b is properly determined by the desired content of the metal clusters in the matrix 204 of the layer 202.

A method of forming the recording layer 202 on the substrate by means of plasma sputtering will b described hereinafter by using the target 220 of FIGS. 18 and 19. The target 220 is connected to the electrode 46 in the envelope 40 of FIG. 4. The envelope 40 is evacuated in the same manner as described above. A gas mixture of a monomer compound gas (e.g., $CH_4$ gas) and argon gas (i.e., Ar) is supplied to the envelope 40 through the port 44. When a plasma is generated by using the RF power in the same manner as described above, a metal carbide matrix (i.e., the recording layer) having the same tellurium clusters and the organic clusters as a copolymer obtained from the monomer compound gas is deposited on the substrate 200, while the clusters are uniformly deposited in the matrix. It should be noted that this recording layer can be formed by a single plasma sputtering process in the same manner as described above.

The optical disk of the third embodiment of the present invention will be described in detail by way of the following examples.

EXAMPLE 7

An RF diode sputtering apparatus having an 8" SiC target was used. A plurality of Ag pellets corresponding to 20% of the total area of the SiC target, and a plurality of nylon pellets corresponding to 10% thereof were placed on the target. A glass substrate having a diameter of 8 inches and a thickness of 1.5 mm was placed on the counter electrode. The envelope was evacuated to a vacuum of $1 \times 10^{-6}$ Torr. Ar gas was supplied such that the internal pressure of the envelope was set at $2 \times 10^{-2}$ Torr. 200-W RF power (13.56 MHz) was supplied between the electrodes to generate a plasma. A recording layer was deposited on the substrate to a thickness of 60 nm after 10 minutes.

The prepared recording medium was rotated at a speed of 600 rpm. A GaAlAs semiconductor laser, having a spot size of 1.5 $\mu$m, a wavelength of 830 nm, an output of 10 mW and a pulse width of 200 nsec, irradiated the recording layer through the substrate to perform recording. Subsequently, information was reproduced by directly radiating a continuous beam having an output of 0.5 mW onto the recording layer. The intensity of the beam reflected by the bubble was sufficiently lower than that of the beam reflected by the flat portion. The CNR of the reproduced signal was as high as 50 dB.

The recorded medium was observed by a scanning electron microscope. Bubbles, each having a size of about $2 \times 1$ $\mu$m at the bottom and a height of about 0.2 $\mu$m, were formed at portions subjected to radiation.

As a comparative example, a thin film was formed under the same conditions as in Example 8, except that the nylon pellets were not placed on the target. Although recording was performed under the same conditions, no bubbles were formed on the recording layer.

The information recording medium was placed in a thermostat at a temperature of 70° C. and a relative humidity of 85%, for 10 days. After this accelerated degradation test, the surface of the recording layer of the medium was observed by an optical microscope. No pinholes were formed. reflectivities of the medium before and after the test, and at a wavelength of 830 nm were measured. The decrease in reflectivity after the test was less than 5%.

EXAMPLE 8

The same sputtering apparatus as in Example 7 was used. A plurality of Te pellets corresponding to 30% of the total area of the SiC target were placed thereon. A gas mixture of $CH_4/Ar=15/85$ was supplied to set the internal pressure of the envelope at $2\times10^{-2}$ Torr. 250-W RF power was supplied between the opposing electrodes to generate a plasma. The substrate comprised polycarbonate. A recording layer was deposited on the substrate to a thickness of 50 nm after 5 minutes.

The recording/reproduction characteristics were examined in the same manner as in Example 7. When the energy of the write beam was set at 8 mW×20 nsec, the CNR of the reproduced signal was as high as 46 dB.

A thin film was deposited on a KBr substrate and peeled therefrom, and the resultant film was observed by a transmission electron microscope. The Te clusters were found to be uniformly dispersed in the TiC matrix. The Te cluster size was about 8 nm, and the Te clusters wee contained in the TiC matrix in the amount of about 40% by volume. A powder of the thin film was heated to analyze the gas component by a mass analyzer. $CH_3$ and $CH_2$ (molecular weights of 15 and 14) were dissociated at a temperature of about 130° C. This dissociation was assumed to be based on decomposition of a polymer of $CH_4$.

EXAMPLE 9

The information recording medium of the present invention can be used as a mother disk for forming a pregrooved resin substrate.

A recording layer was deposited on a substrate having a thickness of 8 mm and a diameter of 150 mm. The film thickness was 120 nm.

A prepared information recording medium was rotated at a speed of 300 rpm. An Ar laser beam was radially scanned to directly irradiate the recording layer. The Ar laser beam was a continuous beam and had an intensity of 8 to 12 mW. The beam intensity was modulated in accordance with the medium format signal. A continuous spiral bubble having a width of 0.3 to 0.8 μm and a height of 0.05 to 0.1 μm was formed on the surface of the recording layer.

The method of forming a stamper structure by using an optical mother disk of FIG. 15 is the same as that described with reference to FIGS. 14A to 14D, a description thereof will, therefore, be omitted.

What is claimed is:

1. A recording medium comprising:
a substrate; and
a recording layer for absorbing radiation energy when radiation is incident thereon such that an intensity of the radiation is changed in accordance with recording information, and for producing a gas component in accordance with a radiation energy level so as to form a local projection to thereby form a protuberance corresponding to the radiation energy level, said recording layer comprising a mixture of a heat-resistant insulative material, metal clusters which absorb the radiation energy and are heated, and organic clusters for producing the gas component upon heating of said metal clusters, causing said insulative material to locally project and form said protuberance on said recording layer.

2. The recording medium according to claim 1, wherein said insulative material is locally peeled from said substrate by the pressure of the gas component produced from said organic clusters upon radiation, and a cavity is formed between said substrate and said insulative material, thereby forming said protuberance.

3. The recording medium according to claim 2, wherein said protuberance is formed on said recording layer when the radiation is incident on said recording medium from a surface of said recording layer, or a surface of said substrate.

4. The recording medium according to claim 2, wherein said metal clusters are introduced simultaneously when said insulative material is deposited on said substrate.

5. The recording medium according to claim 4, wherein said organic clusters are introduced simultaneously when said insulative material is deposited on said substrate.

6. The recording medium according to claim 5, wherein said recording layer produces an amount of the gas component which changes in accordance with a change in content of said organic clusters in said insulative material.

7. The recording medium according to claim 5, wherein said recording layer changes absorption coefficient of the radiation energy in accordance with a change in content of said metal clusters in said insulative material.

8. The recording medium according to claim 7, wherein said recording layer produces an amount of the gas component which changes in accordance with both a change in content of said organic clusters in said insulative material, and a change in the absorption coefficient of the radiation energy of said metal clusters.

9. The recording medium according to claim 8, wherein said insulative material comprises a specific material which is thermally and chemically stable.

10. The recording medium according to claim 9, wherein said insulative material comprises a metal oxide.

11. The recording medium according to claim 10, wherein said insulative material comprises an indium oxide.

12. The recording medium according to claim 9, wherein said insulative material comprises a metal nitride.

13. The recording medium according to claim 9, wherein said insulative material comprises a metal carbide.

14. The recording medium according to claim 9, wherein said metal clusters and said organic clusters are substantially and uniformly contained in said insulative material.

15. A method for manufacturing a recording medium of a type wherein a protuberance is formed thereon in response to radiation when the radiation, with an intensity that changes in accordance with recording information, is incident thereon, comprising the steps of:

placing a substrate in a low-pressure gaseous atmosphere;

placing a target body in the gaseous atmosphere to substantially oppose said substrate; and performing plasma sputtering by generating a plasma between said target body and said substrate to deposit a single recording layer as a mixture of different types of particles containing an insulative material of a matrix, metal clusters and organic clusters, said recording layer being arranged such that, upon radiation, said metal clusters absorb radiation energy, said organic clusters produce a gas component upon heating of said metal clusters due to energy absorption, and said insulative material is locally projected to form a protuberance upon radiation.

16. The method according to claim 15, wherein the content of said metal clusters contained in said recording layer is changed by controlling the content of said metal clusters contained in said different types of particles generated by plasma sputtering, thereby controlling an absorption efficiency of radiation energy by said recording layer.

17. The method according to claim 15, wherein the content of said organic clusters contained in said recording layer is changed by controlling the content of said organic clusters contained in said different types of particles generated by plasma sputtering, thereby controlling an amount of the gas component produced from said recording layer.

18. The method according to claim 17, wherein said target body comprises a target layer of an insulative material, at least one metal pellet formed on said target layer and at least one organic pellet formed on said target layer, the contents of said metal clusters and said organic clusters contained in said recording layer being controlled by changing the number of metal pellets and the number of organic pellets.

19. The method according to claim 17, wherein said target body comprises a target layer of an insulative material and at least one metal pellet formed on said target layer, the content of said metal clusters contained in said recording layer being controlled by changing the number of metal pellets.

20. The method according to claim 18 or 19, wherein said substrate is rotatably supported in the gaseous atmosphere.

* * * * *